(12) United States Patent
Ohsaki et al.

(10) Patent No.: US 6,305,757 B1
(45) Date of Patent: Oct. 23, 2001

(54) BRAKE BOOSTER NEGATIVE PRESSURE CONTROLLER

(75) Inventors: Satoru Ohsaki; Yoshiya Takano, both of Hitachinaka; Hirofumi Yano, Yokohama, all of (JP)

(73) Assignees: Hitachi, Ltd., Tokyo; Nissan Motor Co., Ltd., Yokohama, both of (JP)

( * ) Notice: Subject to any disclaimer, the term of this patent is extended or adjusted under 35 U.S.C. 154(b) by 0 days.

(21) Appl. No.: 09/216,946

(22) Filed: Dec. 21, 1998

(30) Foreign Application Priority Data

Dec. 19, 1997 (JP) .................................................... 9-351465

(51) Int. Cl.[7] ....................................................... B60T 8/44
(52) U.S. Cl. ......................... 303/114.3; 188/356; 60/397
(58) Field of Search ............................. 60/397; 303/114.3, 303/141, 113.13, 114.1; 188/356, 357, 358, 359

(56) References Cited

U.S. PATENT DOCUMENTS

| 3,792,761 | * | 2/1974 | Ball et al. ............................. 477/182 |
| 5,332,056 | * | 7/1994 | Niibe et al. ........................ 303/114.3 |
| 5,411,452 | * | 5/1995 | Kayayama ....................... 303/122.05 |
| 5,826,559 | * | 10/1998 | Ichimoto et al. ..................... 123/295 |
| 5,846,164 | * | 12/1998 | Harada ............................... 303/114.3 |
| 5,918,462 | * | 7/1999 | Mitani .................................... 60/397 |
| 5,950,595 | * | 9/1999 | Yoshioka et al. ................. 303/114.3 |
| 6,017,100 | * | 1/2000 | Mizuno et al. .................... 303/114.3 |
| 6,120,414 | * | 9/2000 | Endo et al. ........................... 477/185 |

FOREIGN PATENT DOCUMENTS

| 7-247866 | 9/1995 | (JP) . |
| 8-164840 | 6/1996 | (JP) . |

* cited by examiner

*Primary Examiner*—Robert J. Oberleitner
*Assistant Examiner*—Thomas J. Williams
(74) *Attorney, Agent, or Firm*—Crowell & Moring LLP (57) ABSTRACT

In order to provide a brake booster negative pressure controller which reduces deterioration in the fuel consumption due to operation for closing a throttle to assure a brake booster negative pressure while assuring the braking capability required according to driving conditions and can safely assure a braking capability even when a failure occurs in a negative pressure sensing system, said brake booster negative pressure controller comprises a brake booster for assuring a master vac negative pressure by using a negative pressure of an engine, a throttle valve whose opening angle can be operated independently from the stroke of an accel pedal, and a brake operation sensing means, wherein the negative pressure controller has a speed sensing means and a means for closing the throttle valve by a predetermined amount when the vehicle speed sensed by the vehicle speed sensing means is equal to or higher than a predetermined value and application of the brake is sensed by the brake operating sensing means.

18 Claims, 8 Drawing Sheets

BRAKE BOOSTER NEGATIVE PRESSURE CONTROLLER

BACKGROUND OF THE INVENTION

The present invention relates to a brake booster negative pressure controller and, more particularly, to a brake booster negative pressure controller for use in an engine operated in a state where a suction negative pressure is low.

In recent years, a vehicle is often provided with a brake booster in order to reduce the stepping force when a brake pedal of the vehicle is stepped on. The brake booster is partitioned into two chambers A and B by a diaphragm therein. An assist force upon braking is obtained by the difference between pressures in the chambers. The chamber A as one of the two chambers is connected to an intake manifold of a suction system of an engine via a one-way valve by piping. When the negative pressure in the intake manifold is higher than that in the brake booster, the one-way valve is opened and the negative pressure in the intake manifold is introduced into the chamber A. In a state where the brake is not applied, the pressures in the two chambers are equal. When the brake is applied, atmosphere is introduced into one of the chambers, causing the pressure difference between the two chambers, and the assist force upon braking is consequently obtained.

In lean-burn engine, cylinder injection engine, or the like, however, operation is performed while taking a large volume of new air, so that only a negative pressure lower than a conventional one is obtained in the intake manifold. Consequently, the negative pressure in the brake booster cannot be sufficiently increased and a sufficient assist force cannot be obtained upon braking.

In order to solve such a problem, the technique (refer to Japanese Patent Application Laid-Open No. 7-247866) of always monitoring the pressure in the brake booster, closing a throttle valve by a predetermined amount while the pressure value is on the atmosphere side more than a predetermined threshold, and increasing the negative pressure in the intake manifold has been proposed.

On the other hand, there is provided the technique (refer to Japanese Patent Application Laid-Open No. 8-164840) of a brake booster negative pressure controller comprising: pressure sensing means for sensing a pressure acting on a brake booster; throttle valve closing means for closing the throttle valve by a predetermined amount when a pressure sensed by the pressure sensing means is lowered below a predetermined threshold pressure; brake operation sensing means for sensing the operation of the brake; and throttle valve closing means for closing the throttle valve by a predetermined amount in the case where the pressure sensed by the pressure sensing means is lowered below the predetermined threshold pressure when the brake is operated by brake operating means.

The braking performance required of the brake is largely influenced by the driving state of the vehicle. When the speed is high, the higher braking performance is necessary. The above-mentioned two techniques of the negative pressure controller intend to always obtain the brake booster negative pressure of a predetermined amount or more at an arbitrary speed. As a result, sufficient braking performance can be always obtained at an arbitrary speed of the vehicle. For this purpose, however, the negative pressure threshold has to be determined on the basis of a case where the highest braking performance is required (at the time of high speed of the vehicle or the like) as a reference.

Consequently, even when the sufficient braking performance is assured at the time of low speed (sufficient negative pressure is assured in the brake booster), the throttle valve is closed by a predetermined amount at the time point when the negative pressure in the brake booster becomes lower than the threshold. Because of the useless operation, there are problems that pumping loss of the engine is increased and the fuel consumption deteriorates.

When the brake is applied while the accel is stepped on, the braking performance higher than that in an ordinary state is required since the braking is already applied. In the conventional brake booster negative pressure controller, however, no measure is taken against the case.

Further, when the negative pressure in the brake booster cannot be normally sensed due to a failure in a sensor or the like, even if the negative pressure in the brake booster is insufficient, there is a case that such a state cannot be detected. There is consequently the possibility that the sufficient braking performance cannot be obtained.

SUMMARY OF THE INVENTION

The present invention is made in consideration of the problem and it is an object of the invention to provide a brake booster negative pressure controller which reduces deterioration in the fuel consumption caused by throttle closing operation for assuring the brake booster negative pressure while assuring a braking capability required according to driving conditions and which can safely assure the braking capability even when a failure occurs in the negative pressure sensing system.

In order to achieve the object, according to the invention, there is provided a brake booster negative pressure controller comprising a brake booster for assuring a master vac negative pressure by using a negative pressure of an engine, a throttle valve whose opening angle can be operated independently from a stroke of an accel, and a brake operation sensing means, characterized in that the negative pressure controller has a vehicle speed sensing means and a means for closing the throttle valve by a predetermined amount when the vehicle speed sensed by the vehicle speed sensing means is equal to or higher than a predetermined value and application of a brake is sensed by the brake operation sensing means.

According to another fundamental embodiment of the invention, there is provided a brake booster negative pressure controller comprising a brake booster for assuring a master vac negative pressure by using a negative pressure of an engine, a throttle valve whose opening angle can be operated independently from a stroke of an accel, a negative pressure sensing means for sensing a negative pressure in the brake booster, a means for closing the throttle valve by a predetermined amount when the detection value obtained by the negative pressure sensing means becomes a value on an atmosphere side more than a predetermined value, and a brake operation sensing means, characterized in that the negative pressure controller has a vehicle speed sensing means and a means for closing the throttle valve by a predetermined amount when the vehicle speed sensed by the vehicle speed sensing means is equal to or larger than a predetermined value and application of a brake is sensed by the brake operation sensing means.

According to an embodiment of the invention, a brake booster negative pressure controller is characterized by comprising a means for changing the throttle valve closing amount on the basis of the vehicle speed sensed by the vehicle speed sensing means or a brake booster negative pressure sensed by the negative pressure sensing means.

Further, according to another preferable embodiment, the brake booster negative pressure controller of the invention is characterized by comprising an accelator hereinafter, accel stroke estimating means for estimating an accel stroke, and that the throttle valve is closed by a predetermined amount when the estimation value of the accel stroke is equal to or larger than a predetermined value and application of the brake is sensed by the brake operation sensing means.

According to one of embodiments, the accel stroke estimating means comprises an engine negative pressure sensing means and an engine negative pressure determining means for determining that the driver performs an operation for continuing the driving when the engine negative pressure is equal to or lower than a predetermined value. According to another embodiment, the accel stroke estimating means comprises an intake air flow rate sensing means and an intake air flow rate determining means for determining that the driver performs an operation for continuing the driving when the intake air flow rate is equal to or larger than a predetermined value. According to further another embodiment, the accel stroke estimating means comprises an accel operation sensing means and an accel operation determining means for determining that the driver performs an operation for continuing the driving when the accel operation amount is equal to or larger than a predetermined value or the detection value indicates that the accel is stepped on.

Further, according to another embodiment of the invention, the brake booster negative pressure controller comprises a means for changing the amount of closing the throttle valve on the basis of an engine negative pressure sensed by the engine negative pressure sensing means, an intake air flow rate sensed by the intake air flow rate sensing means, an accel stroke sensed by the accel operation sensing means, or a brake stroke sensed by the brake operation sensing means.

Further, according to another preferable embodiment of the invention, there is provided a brake booster negative pressure controller comprising a brake booster, a throttle valve whose opening angle can be operated independently from a stroke of an accel, a negative pressure sensing means for sensing a negative pressure in the brake booster, a negative pressure determining means for determining that the negative pressure sensed by the negative pressure sensing means is equal to or lower than a threshold, and a means for closing the throttle valve by a predetermined amount when it is determined by the negative pressure determining means that the negative pressure is equal to or lower than the threshold, wherein the controller has:
a means for closing the throttle valve by a predetermined amount when it is determined that the negative pressure is equal to or lower than the threshold in any of the one or more other negative pressure determining means for determining that the negative pressure sensed by the negative pressure sensing means is equal to or lower than a predetermined value; two or more negative pressure determining means for determining that the negative pressure in any of one or more other brake booster negative pressure sensing means is equal to or lower than a predetermined value; and a means for closing the throttle valve by a predetermined amount when the negative pressure is equal to or lower than the threshold in any of the two or more negative pressure determining means.

According to the brake booster negative pressure controller of the invention constructed as mentioned above, when an arbitrary part in the negative pressure monitoring system is failed or when any of the negative pressure determining means and the like makes erroneous determination due to a bug, insufficiency of the negative pressure in the brake booster is sensed and the throttle valve can be closed, so that the necessary braking performance can be obtained. The malfunction indicator light or the like is turned on, thereby enabling the driver to be urged to repair the failure before a new failure occurs.

While obtaining the braking capability according to the driving conditions on the basis of information such as vehicle speed, brake operation, and accel operation, the fuel consumption deterioration caused by the operation for closing the throttle valve necessary for the brake capability can be minimized.

Further, when both of the accel and brake are stepped on, the throttle valve is closed irrespective of the detection value of the negative pressure sensor. Consequently, the negative pressure higher than an ordinary threshold is assured and the braking force higher than an ordinary one can be obtained, so that the possibility of runaway due to erroneously operation of the pedal can be reduced.

DETAILED DESCRIPTION OF THE PREFERRED EMBODIMENT

Embodiments of a brake booster negative pressure controller of the invention will be described in detail hereinbelow with reference to the drawings.

Figure 1:
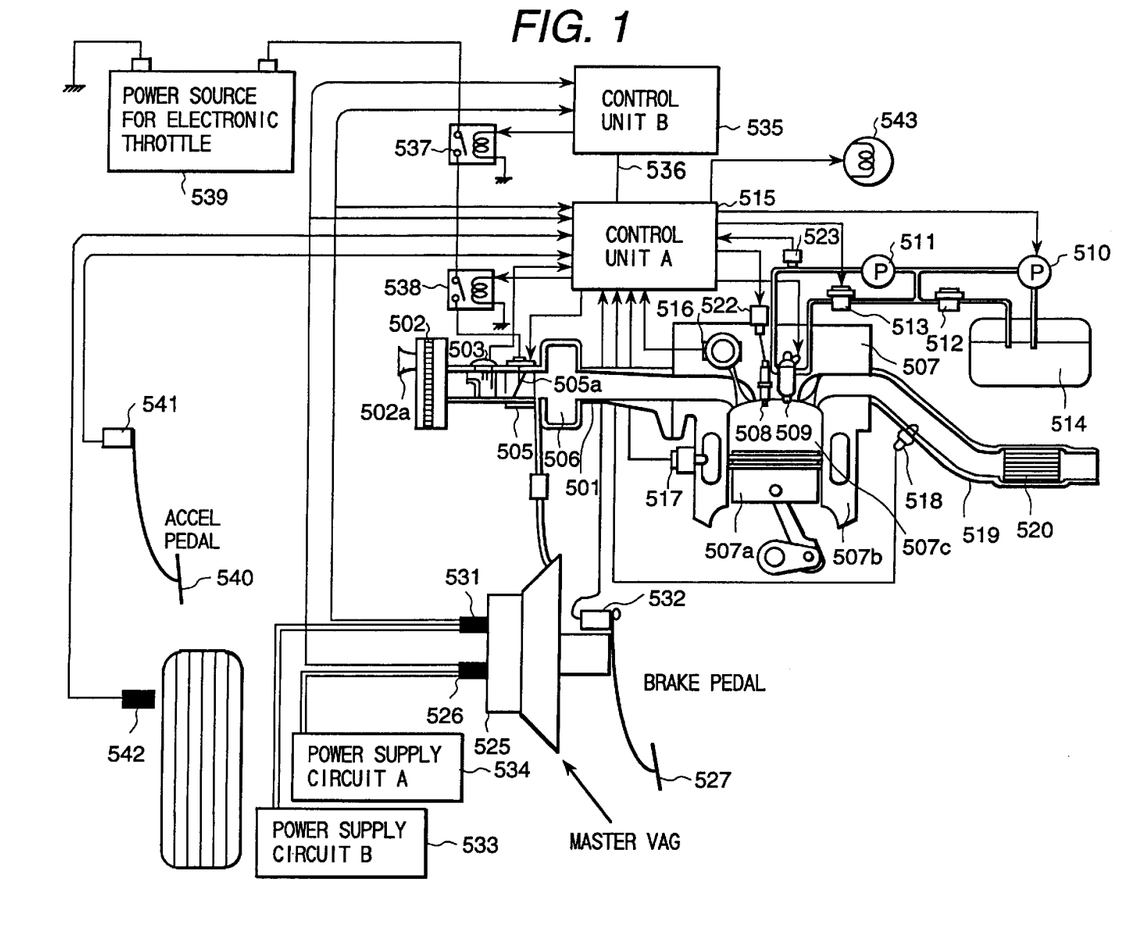
FIG. 1 is a diagram showing the whole configuration of an engine control system having a brake booster negative pressure controller of an embodiment of the invention.

FIG. 1 shows a whole configuration of an engine control system provided with a brake booster negative pressure controller of a first embodiment of the invention. In FIG. 1, air introduced into an engine 507 is taken from the inlet 502a of an air cleaner 502, passes through an intake air meter 503 and an electronic throttle 505 in which a throttle valve 505a for controlling an intake air flow is disposed, and enters an intake manifold 506.

The intake air led to the intake manifold 506 is distributed to intake pipes connected to cylinders 507b of the engine 507 and is led to a combustion chamber 507c in the cylinder 507b.

On the other hand, fuel such as gasoline is sucked from a fuel tank 514 and pressurized by fuel pumps 510 and 511, and the pressurized fuel is supplied to a fuel system in which a fuel injection valve 509 and variable fuel pressure regulators 512 and 513 which control the fuel to be within a predetermined range are disposed. The fuel pressure is measured by a fuel pressure sensor 523 and is injected from the fuel injection valve 509 whose fuel injection port is open to the combustion chamber 507c in each of the cylinders 507b into the combustion chamber 507c. The air flowed into the combustion chamber 507c and the injected fuel are mixed, ignited by a spark plug 508 by piezo electricity from an ignition coil 522, and are burned. The exhaust gas burned in the combustion chamber 507c of the engine 507 is led to an exhaust pipe 519 and is discharged to the outside of the engine 507 via a catalyst 520.

A signal indicative of the intake air flow is outputted from the air flow meter 503 and is supplied to a control unit A 515. A crank angle sensor 516 is rotated by the camshaft (not shown in the diagram) of the engine 507 and generates a signal indicative of a rotation position of the crankshaft. This signal is also supplied to the control unit A 515. By the signals, fuel injection timing, ignition timing, an opening angle of SCV, and the like are controlled. An A/F sensor 518 provided for the exhaust pipe 519 senses an actual operation air-fuel ratio from components of the exhaust gas and outputs a signal of the ratio. This signal is also supplied to the control unit A 515.

The control unit A 515 executes a fuel supply control, an ignition timing control, an intake air volume control, an emission regulation adapted control, and the like by fetching signals from various sensors and the like which sense the operating conditions of the engine 507 as inputs, executing a predetermined computing process, outputting various control signals derived as results of the computing process, and outputting predetermined control signals to the fuel injection valve 509, the ignition coil 522, and the like. In the control unit A 515, by processing a signal of the crank angle sensor 516, fluctuation in the rotation of the engine 507 is calculated.

Further, an accel pedal 540 and a brake pedal 527 are arranged. An accel switch 541 for detecting the operation of the accel pedal 540 is attached to the accel pedal 540. A brake switch 532 for detecting the operation of the brake pedal 527 is attached to the brake pedal 527. A speed sensor 542 is mounted in the transmission (not shown). Detection values detected by those components are supplied to the control unit A 515 and a control unit B 535.

A brake booster 525 constructing the brake booster negative pressure controller of the embodiment is operated by the brake pedal 527 and two negative pressure sensors, namely, a sensor A 526 and a sensor B 531 for sensing the negative pressure of the brake booster 525 are attached to the brake booster 525. A power is supplied from a power supply circuit A 534 to the sensor A 526 and a power is supplied from a power supply circuit B 533 to the sensor B 531. Detection values obtained by the negative pressure sensors A 526 and B 531 are supplied to the control units A 515 and B 535. A communication line 536 is provided between the control units A 515 and B 535 and data is transferred between the control units A 515 and B 535 through the communication line 536.

The opening angle of the electronic throttle 505 is controlled by the control unit A 515 and the power are supplied from a power source 539 for the electronic throttle. The power source 539 can be turned on/off by operating relays 537 and 538 from the control units A 515 and B 535. In a normal state where there is no fault in the brake booster negative pressure controller, the switches of the relays 537 and 538 are kept in an ON state. In the electronic throttle 505, when the power is not supplied, the throttle valve 505a is returned to the fully closed position by a spring.

Figure 2:
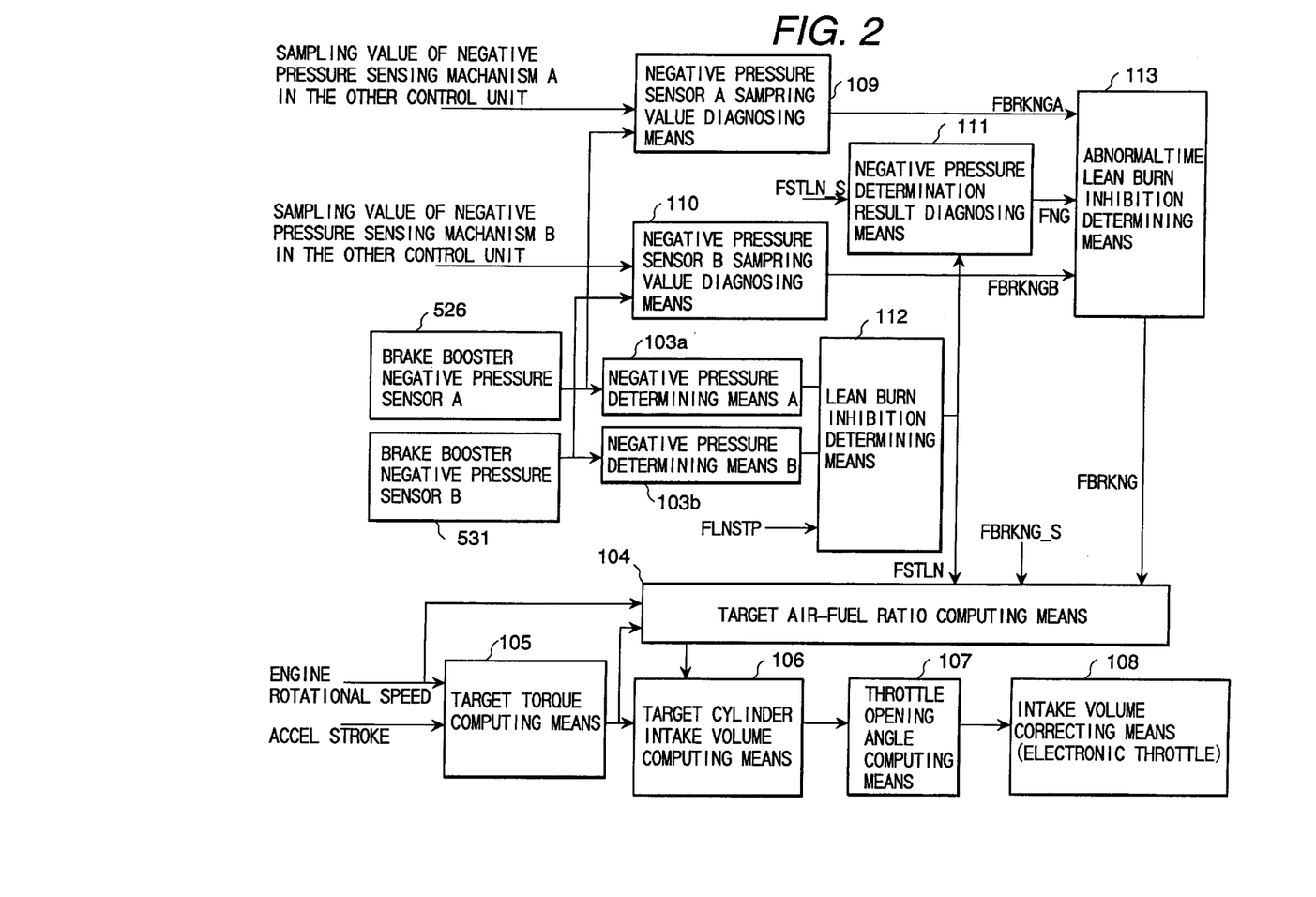
FIG. 2 is a block diagram showing the control of a control unit A in the brake booster negative pressure controller in FIG. 1.

FIG. 2 is a block diagram of a control showing the contents of processes performed in the control unit A 515. An accel stroke as an intention of the driver is inputted together with the engine rotational speed to a target torque computing means 105 where a target torque necessary to realize the acceleration/deceleration corresponding to the operation of the driver is calculated. In a target air-fuel ratio computing means 104, among a stoichiometric ratio and air-fuel ratios corresponding to a homogeneous lean burn and a stratification lean burn in addition to the engine speed, a maximum air-fuel ratio (target air-fuel ratio) which can realize the target torque is usually selected. A target cylinder intake volume computing means 106 calculates a target intake volume necessary to realize both of the target air-fuel ratio and a target torque from the target air-fuel ratio and torque, a throttle opening angle computing means 107 calculates a target throttle opening angle which can realize the target intake volume, and an intake volume correcting means 108 controls so that the electronic throttle 505 is opened at the target throttle opening angle. In this instance, the target intake volume and an intake volume obtained from an airflow sensor (not shown) or an intake manifold pressure sensor (not shown) are compared with each other. When the difference between them is equal to or larger than a predetermined value, the electronic throttle power source relay 537 is turned off, the power of the electronic throttle 505 is cut, and the throttle valve 505a is fully closed.

While the air-fuel ratio corresponding to the homogeneous lean burn or the stratification lean burn is selected in the target air-fuel ratio computing means 104, the air flow rate is higher than that at the time of stoichiometric ratio, so that the negative pressure in the intake manifold 506 becomes lower than that at the time of stoichiometric ratio. Consequently, a case where a sufficient negative pressure is not assured in the brake booster 525 occurs.

On the other hand, a detection value obtained by the brake booster negative pressure sensor A 526 is supplied to both of a brake booster negative pressure determining means A 103a and a negative pressure sensor A sampling value diagnosing means 109. The negative pressure sensor sampling value diagnosing means 109 obtains the absolute value of the difference between a sampling value of the negative pressure sensor A 526 in the control unit A 515 and a sampling value of the negative pressure sensor A 526 in the control unit B 535 transferred from the control unit B 535 via the communication line 536. When the result is equal to or larger than a predetermined value, the diagnosing means 109 determines that a fault occurs in the A/D converter in either one of the control units and sets a flag FBRKNGA requesting to set an abnormal time lean burn inhibition flag FBRKNG.

A similar diagnosis is performed in a negative pressure sensor B sampling value diagnosing means 110 with respect to a sampling value of the negative pressure sensor B 531 and a value of a flag FBRKNGB requiring to set the lean burn inhibition flag FBRKNG at the time of occurrence of abnormality is obtained. In the negative pressure determining means A 103a, a process shown in the flowchart of FIG. 4 is executed every predetermined time.

Figure 4:
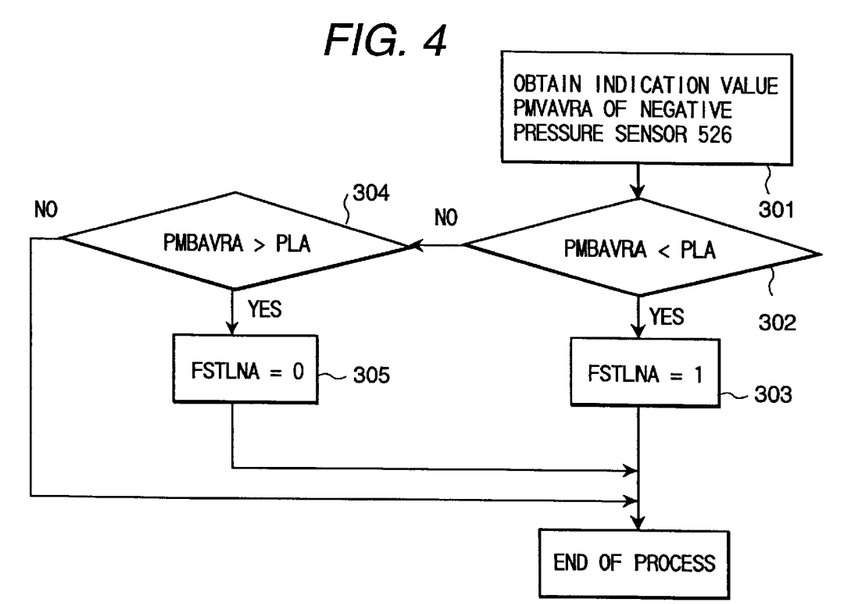
FIG. 4 is a flowchart of a control executed by a negative pressure determining means in the brake booster negative pressure controller in FIG. 1.

In FIG. 4, the voltage of the negative pressure sensor A 526 is converted into a negative pressure in step 301 which is substituted for a variable PMBAVRA. After that, in step 302, whether or not the value of the variable PMBAVRA is equal to or smaller than a negative pressure PLA necessary for braking is determined. When it is determined that it is equal to or smaller than the negative pressure (insufficient negative pressure determining threshold) PLA necessary for braking, the processing routine advances to step 303 and a flag FSTLNA requiring to set a flag FSTLN for inhibiting the lean burn is set to "1". When it is determined that the value of the variable PMBAVRA is equal to or larger than the negative pressure PLA necessary for braking, the routine advances to step 304, and further, whether or not the variable PMBAVRA is equal to or larger than a braking assuring negative pressure (negative pressure assurance determining threshold) PHA (>PLA) is determined. When it is determined to be equal to or larger than the negative pressure assurance determination threshold PHA, the flag FSTLNA for requiring to set the flag FSTLN inhibiting the lean burn is cleared to "0" in step 305. When it is determined in step 304 that the variable PMBAVRA is equal to or smaller than the negative pressure assurance determining threshold PHA, the process is finished without performing anything.

A similar process is performed also to a voltage obtained by the negative pressure sensor B 531 by a negative pressure determining means B 103b. The detected negative pressure is substituted for a variable PMBAVRB. When it is determined that the value of the variable PMBAVRB is equal to or smaller than a negative pressure PLB necessary for braking, a flag FSTLNB requiring to set the flag FSTLN which inhibits the lean burn is set to "1". When it is determined that the variable PMBAVRB is equal to or larger than a braking assuring negative pressure (negative pressure assurance determining threshold) PHB (>PLB), the flag FSTLNB is cleared to "0".

The values of the flags FSTLNA and FSTLNB inhibiting the lean burn obtained as mentioned above are inputted to a lean burn inhibition determining means 112. Even one of the flags is "1", the lean burn inhibition determining means 112 sets the value of the flag FSTLN inhibiting the air-fuel ratio corresponding to lean burn from being selected by the target air-fuel ratio computing means 104 is set to "1".

Figure 3:
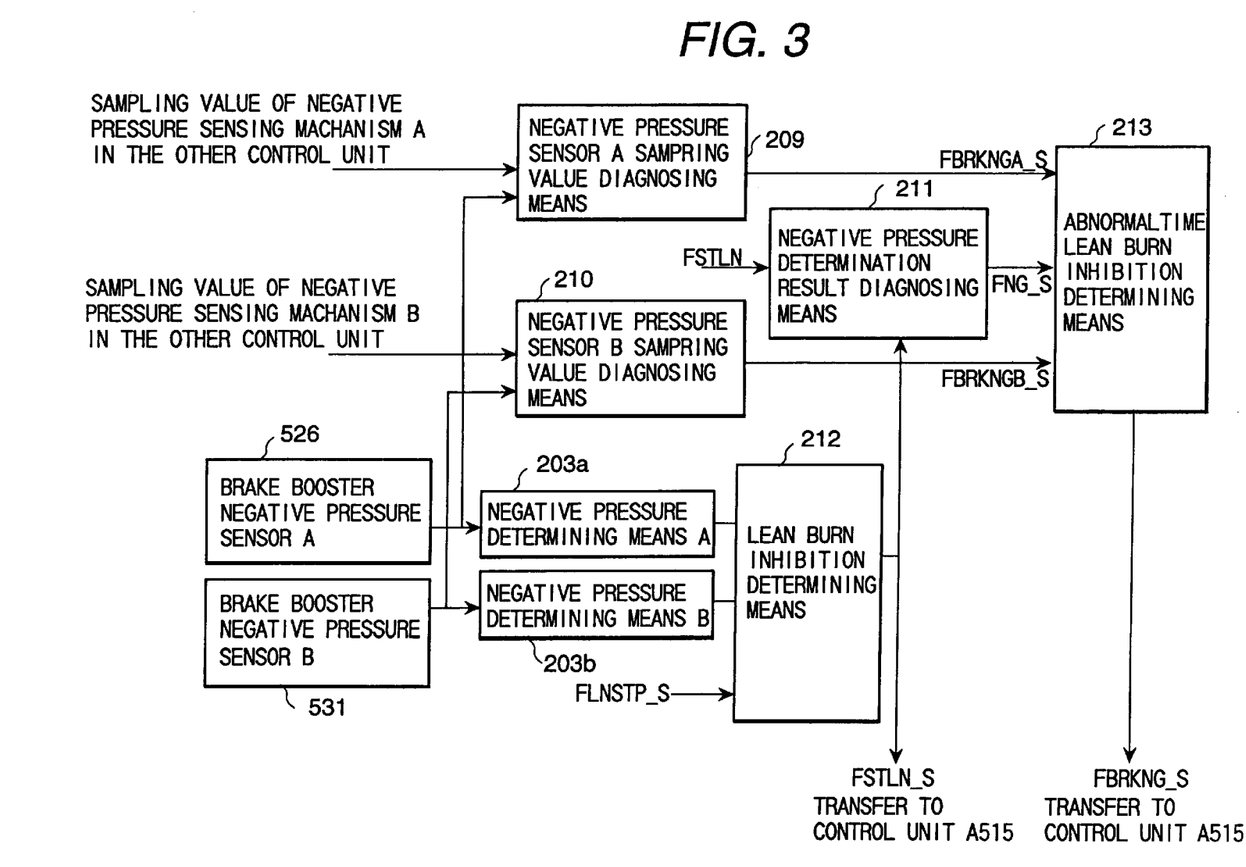
FIG. 3 is a block diagram showing the control of a control unit B in the brake booster negative pressure controller in FIG. 1.

The above-described processes in the negative pressure determining means A 103a and B 103b, the negative pressure sensor sampling value diagnosing means 109, the negative pressure sensor sampling value diagnosing means 110, and the lean burn inhibition determining means 112 are performed also in the control unit B 535 as shown in FIG. 3.

Sampling values of the negative pressure sensors A 526 and B 531 obtained in the control unit B 535 have sampling errors different from those included in the sampling values of the negative pressure sensors in the control unit A 515. Consequently, in order to avoid that the determination results in negative pressure determining means A 203a and B 203b are different from those in the control unit A 515, the determination is carried out to negative pressure recognition values PMBAVRA and PMBAVRB in the control unit A 515.

The negative value recognition values PMBAVRA and PMBAVRB are transferred to the control unit B 535 via the communication line 536. The determination results in the negative pressure determining means A 203a and B 203b are supplied to a lean burn inhibition determining means 212 and a lean burn inhibition determination flag FSTLN#S is obtained in a manner similar to the case in the control unit A 515.

The values of the lean burn inhibition determination flags FSTLN and FSTLN#S obtained as mentioned above are inputted to both of the negative pressure determination result diagnosing means 111 in the control unit A 515 and a negative pressure determination result diagnosing means 211 in the control unit B 535. The negative pressure determination result diagnosing means 111 in the control unit A 515 compares the lean burn inhibition determination flags FSTLN and FSTLN#S. When they do not coincide with each other, a flag FNG requesting to set the abnormal time lean burn inhibition flag FBRKNG is set. A similar process is carried out also in the negative pressure determination result diagnosing means 211 in the control unit B 535. When the flags do not coincide with each other, a flag FNG#S requesting to set the abnormal time lean burn inhibition flag FBRKNG#S is set.

When either the abnormal time lean burn inhibition flag FBRKNGA, FBRKNGB, or FNG is set to "1", an abnormal time lean burn inhibition determining means 113 in the control unit A 515 sets the abnormal time lean burn inhibition flag FBRKNG to "1". Similarly, in an abnormal time lean burn inhibition determining means 213 in the control unit B 535 as well, when either FBRKNGA#S, FBRKNGB#S, or FNG#S is equal to "1", the abnormal time lean burn inhibition flag FBRKNG#S is set to "1" and, simultaneously, a malfunction indicator light 543 (FIG. 1) is turned on.

In the target air-fuel ratio computing means 104, since the selection of the air-fuel ratio corresponding to the lean burn is inhibited when the flag FSTLN, FBRKNG, or FBRKNG#S is set to "1", the target air-fuel ratio is set to a low value. As a result, the value of the target intake volume calculated by the target intake volume computing means 106 becomes low, the throttle opening angle is controlled to become small, the negative pressure in a collector 506 increases, and the negative pressure in the brake booster 525 accordingly increases, thereby obtaining a necessary brake assist force.

By constructing the brake booster negative pressure controller of the embodiment as mentioned above, when an arbitrary one part in the negative pressure monitoring system (the negative pressure sensor A 526, the power supply circuit 534 for the sensor 526, the negative pressure sensor B 531, the power supply circuit 533 for the sensor 531, the A/D A/D converter (not shown) in the control unit A 515, the A/D converter (not shown) in the control unit B 535, and harnesses) is failed or when either the negative pressure determining means 103a, 103b, the sampling value diagnosing means 109, 110, or the negative pressure determination result diagnosing means 111 determines erroneously due to a bug, insufficiency in the negative pressure in the brake booster is detected and the throttle valve 505a can be closed, so that the necessary braking performance can be obtained. The malfunction indicator light 543 is turned on, thereby enabling the driver to be urged to repair the trouble before a new failure occurs.

Since the braking capability necessary for the brake differs according to the speed of a vehicle and the operation of the driver, in order to obtain a sufficient braking capability under any driving conditions of the vehicle, the value of the negative pressure insufficiency determining threshold PLA has to be determined on the basis of the case where the highest braking capability is required as a reference. As a result, even when a high braking capability is not required so much in a driving state such that the vehicle speed is low and when a negative pressure sufficient to perform braking from such a state is still assured in the brake booster, the operation for closing the throttle valve 505a to assure the negative pressure is executed at the time point when the negative pressure becomes to an atmosphere side more than the negative pressure insufficiency determining threshold PLA. Because of the unnecessary operation, the pumping loss increases and the fuel ratio deteriorates accordingly.

The brake booster negative pressure controller of the embodiment, however, has the function of obtaining the braking performance for assuring the negative pressure necessary according to the operating conditions, thereby enabling the increase in the pumping loss caused by the operation for closing the throttle valve which assures the negative pressure more than necessary to be suppressed and improving the fuel consumption. The construction for realizing the function will be described hereinbelow.

In FIG. 1, the detection values obtained by the accel switch 541, the brake switch 532, and the speed sensor 542 are inputted to both of the control units A 515 and B 535. In the control units A 515 and B 535, the lean burn inhibition is determined and the negative pressure insufficiency determination threshold PLA is switched to/from the negative pressure assurance determination threshold PHA on the basis of the detection values.

Figure 5:
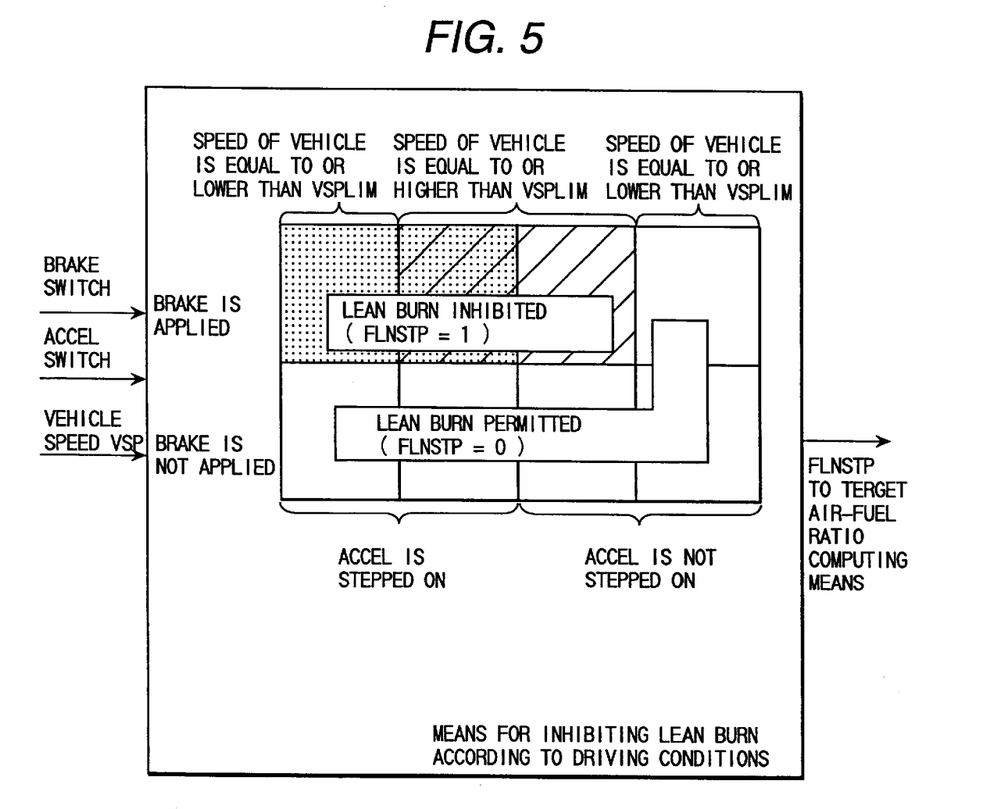
FIG. 5 is a diagram illustrating the contents of a means for inhibiting lean burn according to driving conditions of the brake booster negative pressure controller in FIG. 1.

FIG. 5 shows a means for inhibiting the lean burn according to driving conditions. The determination of the lean burn inhibition or permission based on the detection values of the accel switch 541, the brake switch 532, and the speed sensor 542 is performed by the means for inhibiting the lean burn according to the travel conditions. When both of the brake and accel pedals are stepped on (painted part in FIG. 5), the braking capability higher as compared with that in an ordinary state is required in order to maintain the vehicle in a stationary state. Consequently, it is necessary to increase the negative pressure in the brake booster by inhibiting the lean burn and closing the throttle valve. In the control to perform the above operation, therefore, the flag FLNSTP requiring to set the flag FSTLN inhibiting the lean burn is set.

Since a higher braking capability is required at the time of high vehicle speed, when the vehicle speed is equal to or higher than a predetermined value VSPLIM (high vehicle speed) and the brake is applied (the part of oblique lines in FIG. 5), the flag FLNSTP requiring to set the flag FSTLN inhibiting the lean burn is set.

When the flag FLNSTP is set to "1", the lean burn inhibition flag FSTLN is set in the lean burn inhibiting means 112 in FIG. 2. In a manner similar to the case of insufficient negative pressure, the air-fuel ratio corresponding to the stoichiometric state is selected in the target air-fuel ratio computing means 104 and the throttle valve 505a is operated in the closing direction. With the increase in the negative pressure in the intake manifold 506, therefore, the negative pressure in the brake booster 525 also increases, so that the necessary braking capability can be obtained.

The means for inhibiting lean burn (FIG. 5) according to the driving conditions is also provided in the control unit B 535. Determination is made in a manner similar to the case in the control unit A 515, the result FLNSTP#S of the determination is supplied to the lean burn inhibition determining means 212, and a process is executed similarly.

Figure 6:
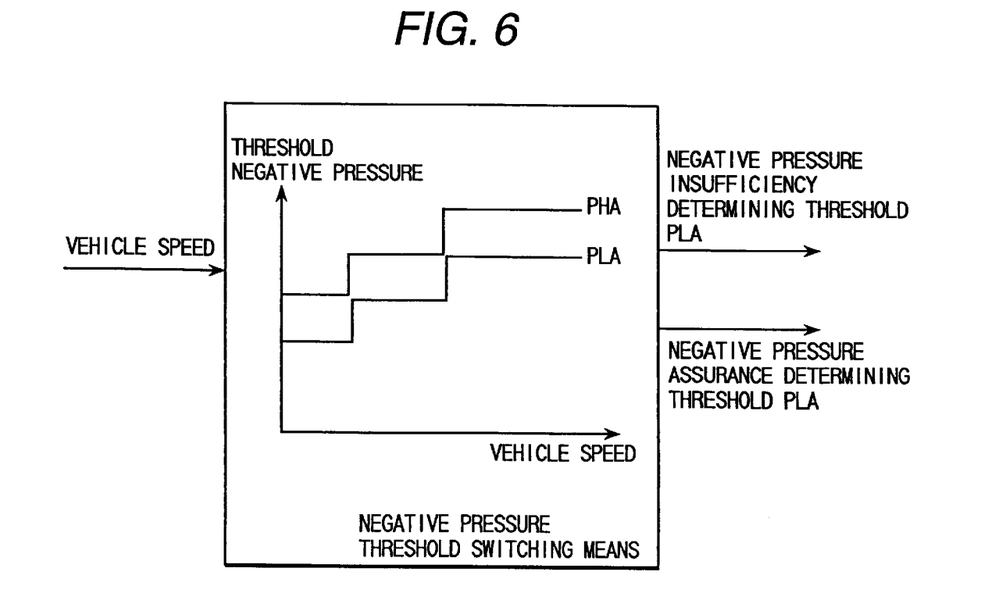
FIG. 6 is a diagram showing a negative pressure threshold switching means in the brake booster negative pressure controller in FIG. 1.

On the other hand, the negative pressure insufficiency determination threshold PLA and the negative pressure assurance determination threshold PHA are switched by the negative pressure threshold switching means shown in FIG. 6 and are obtained by searching a table with a vehicle speed. From the table, a value of the brake booster negative pressure necessary to obtain the brake assist force required to stop the vehicle from an arbitrary speed is obtained. At the time of low vehicle speed which does not require a high braking capability, therefore, the execution of closing operation of the throttle valve for assuring the negative pressure more than necessary is avoided, the increase in the pumping loss is suppressed, and the fuel consumption is improved.

Figure 7:
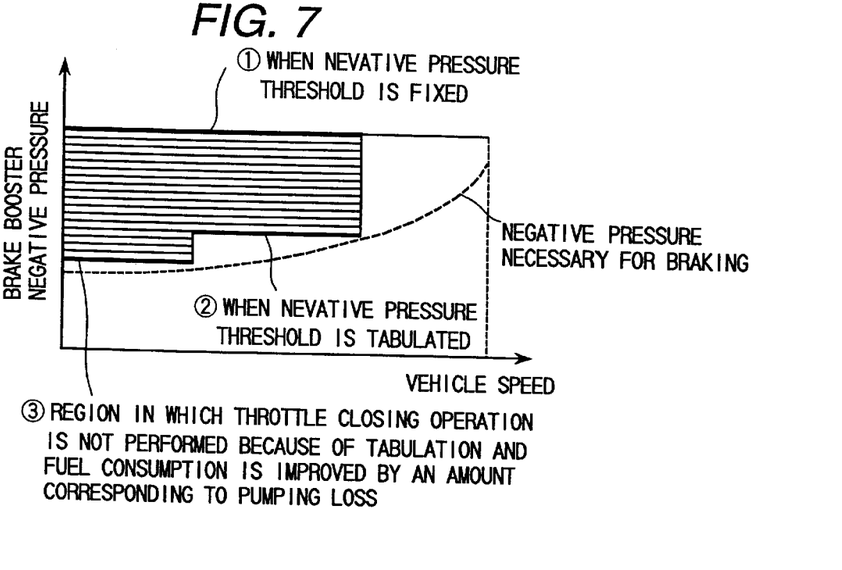
FIG. 7 is a diagram of an actual example in which the negative threshold is tabulated and obtained from the relation between the booster negative pressure and the vehicle speed.

FIG. 7 illustrates the above operation. (1) When the negative pressure threshold is fixed, in order to obtain a sufficient brake performance with an arbitrary vehicle speed, the negative pressure insufficiency determination threshold has to be set to a value at which the brake capability required at the time of the highest vehicle speed is obtained, so that the negative pressure threshold is inevitably set to a high value (negative pressure side). On the contrary, (2) when the negative pressure threshold tabulated in the present embodiment is employed, setting is carried out according to the required braking capability. Consequently, an insufficient negative pressure is not determined even in the region of (3), so that the increase in pumping loss caused by the operation for closing the throttle valve to assure the negative pressure can be suppressed by such an amount and the fuel consumption can be improved.

Figure 8:
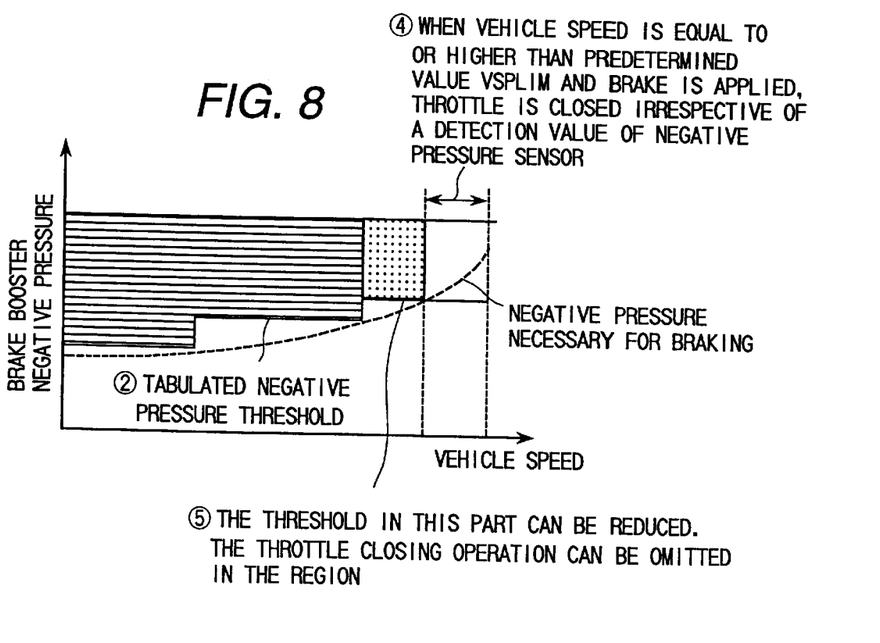
FIG. 8 is a diagram of another actual example in which the negative pressure threshold is tabulated and obtained from the relation between the booster negative pressure and the vehicle speed.

When the function of the means for determining lean burn inhibition according to the driving conditions is considered, the threshold table as shown in FIG. 8 can be also set and the fuel consumption can be improved in a wider region.

According to the brake booster negative pressure controller of the embodiment as mentioned above, even in the case where an arbitrary part of the negative pressure monitoring system is failed, insufficiency in the negative pressure can be detected, the brake booster negative pressure which enables safe braking can be assured, and deterioration in the fuel consumption caused by the operation for closing the throttle valve necessary for the braking performance can be minimized while obtaining the braking capability according to the travel conditions on the basis of the information of the vehicle speed, brake operation, accel operation, and the like.

Although the embodiment of the invention has been described above in detail, the invention is not limited by the foregoing embodiment but can be variably changed in designing without departing from the spirit of the invention described in the scope of the claims.

Figure 9:
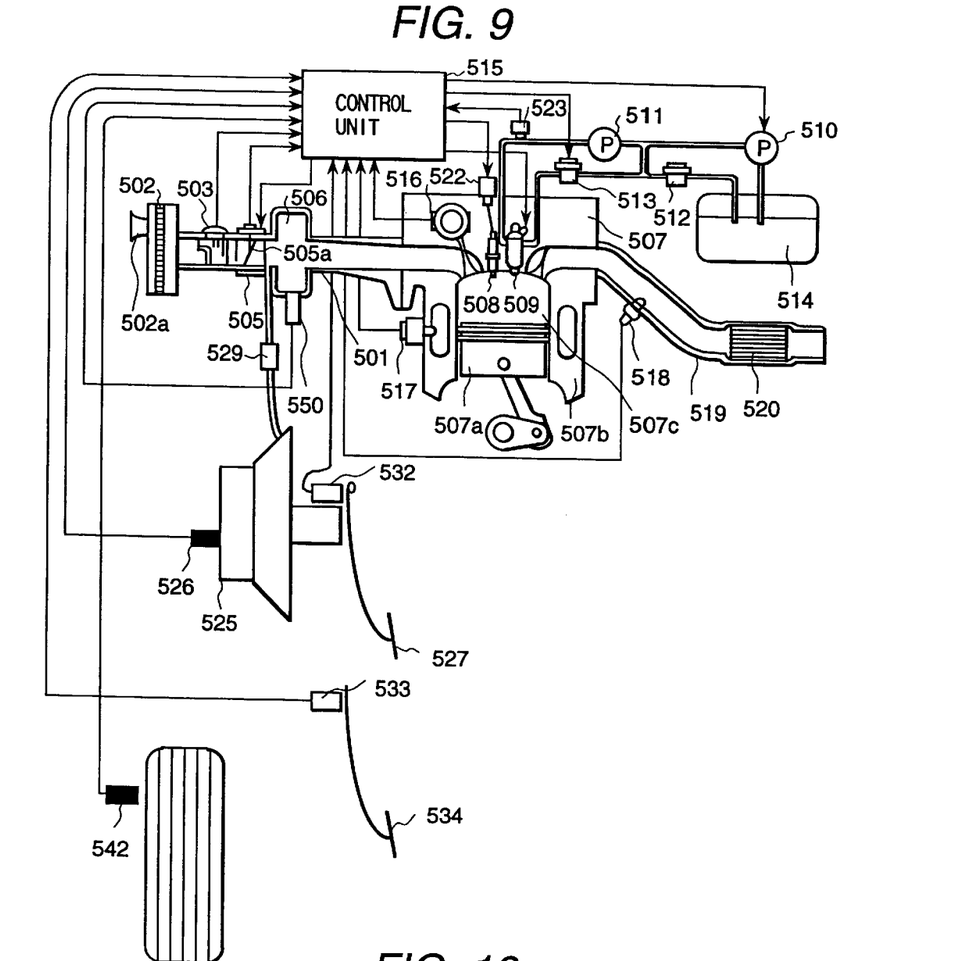
FIG. 9 is a diagram showing the whole configuration of an engine control system having a brake booster negative pressure controller of another embodiment of the invention.

For example, FIG. 9 shows an engine control system having the brake booster negative pressure controller of another embodiment of the invention. According to the embodiment, the brake booster is provided with only the single negative pressure sensor 526 and the single control unit 515.

In the system having only one negative pressure sensing mechanism of the present embodiment, in cases such that the negative pressure sensor is failed and the insufficiency in the negative pressure cannot be detected, the means for inhibiting lean burn (FIG. 5) according to the driving conditions described in the first embodiment can be used as an auxiliary negative pressure assuring means for assuring the minimum negative pressure.

In the present embodiment, a negative pressure switch (not shown) can be substituted for the functions of the negative pressure sensor B 531 and the negative pressure determining means 103b (or 203b) of the first embodiment.

Figure 10:
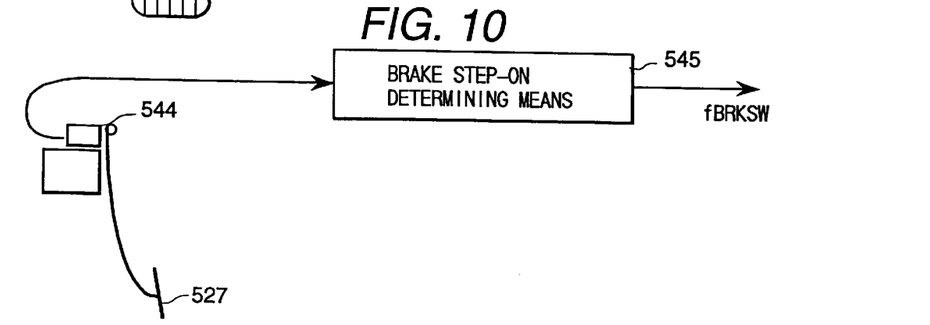
FIG. 10 is a partial control block diagram of a brake stroke sensor replacing a brake switch in the brake booster negative pressure controller in FIG. 9.

In the present embodiment, the function of the brake switch 532 can be replaced by a sensor 544 for sensing the stepping force of the brake as shown in FIG. 10. Detection can be also performed by a brake step-on determining means 545 which determines that the brake is applied when the detection value of the sensor 544 is equal to or larger than a predetermined value.

Figure 11:
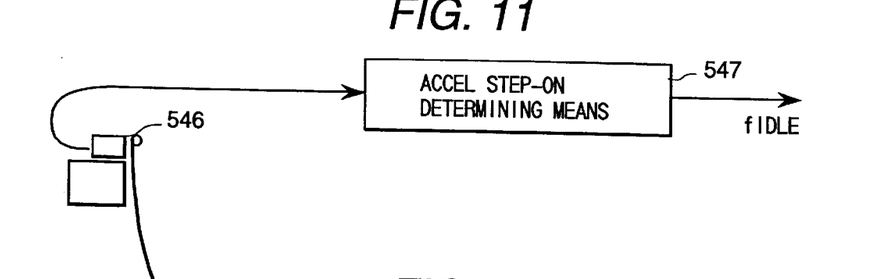
FIG. 11 is a partial control block diagram of an accel stroke sensor replacing an accel switch in the brake booster negative pressure controller in FIG. 9.

Further, in the embodiment, the function of the accel switch 541 is replaced by a sensor 546 for sensing the accel stroke as shown in FIG. 11 and an accel stroke estimating means having an accel step-on determining means 547 for determining that the accel pedal is stepped on when the detection value of the sensor 546 is equal to or larger than a predetermined value can be constructed.

Figure 12:
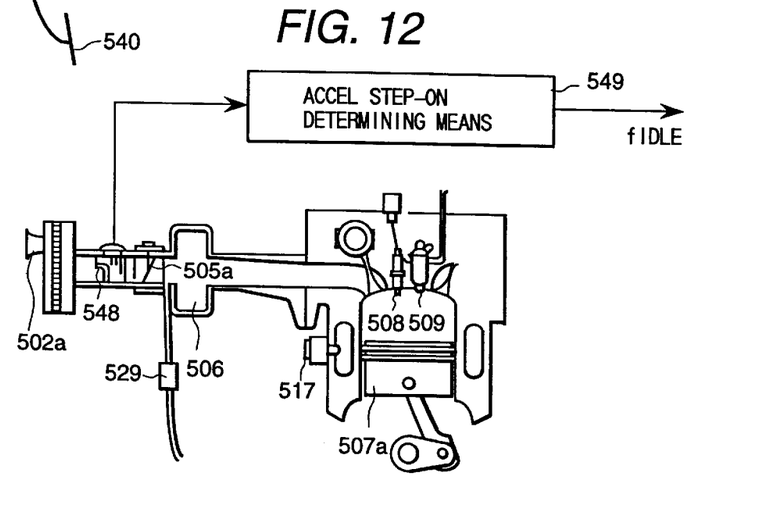
FIG. 12 is a partial control block diagram of an accel step-on determining means replacing the accel switch in the brake booster negative pressure controller in FIG. 9.
Figure 13:
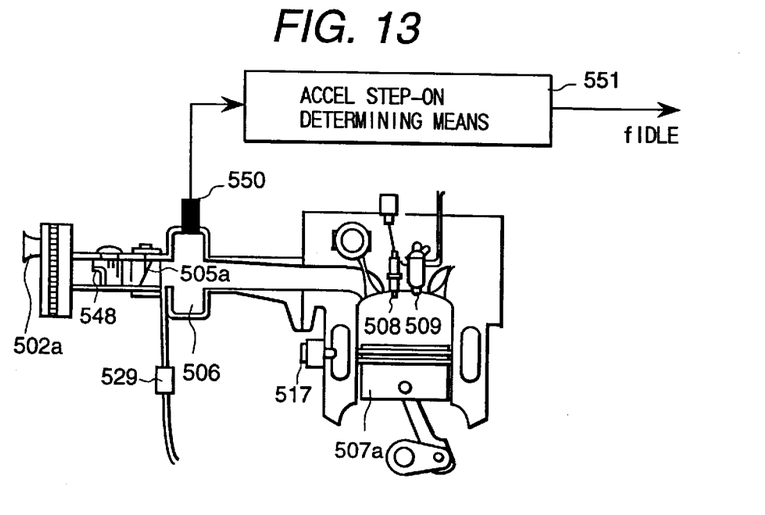
FIG. 13 is a partial control block diagram of an intake manifold negative pressure sensing means replacing the accel switch in the brake booster negative pressure controller in FIG. 9.

Furthermore, as shown in FIG. 12, the accel stroke estimating means can be constructed by comprising an air flow rate sensing means 548 and an accel step-on determining means 549 for determining that the accel pedal is stepped on when the detection value of the sensor 548 is equal to or larger than a predetermined value. As shown in FIG. 13, the accel stroke estimating means can be constructed by comprising an intake manifold negative pressure detecting means 550 and an accel step-on determining means 551 for determining that the access pedal is stepped on when a detection value of the intake manifold negative pressure detecting means 550 is equal to or lower than a predetermined value.

Further, the detection value obtained from the speed sensor mechanism 542 in the foregoing two embodiments can be replaced by the product of the engine rotational speed and the gear ratio in a transmission (not shown).

As will be understood from the above description, according to the brake booster negative pressure controller of the invention, since the negative pressure is monitored by two independent negative pressure monitoring systems, even if an arbitrary part in the monitoring system is failed, the insufficiency of negative pressure can be certainly detected.

Since the negative pressure determination threshold is switched according to the vehicle speed, the execution of closing operation of the throttle valve for assuring the negative pressure more than necessary is avoided at the time of low vehicle speed when the high braking capability is not required, and the increase in the pumping loss of the engine is suppressed, so that the fuel consumption can be improved.

Furthermore, when both of the accel and brake are applied, the throttle valve is closed irrespective of the detection value of the negative pressure sensor. Consequently, the negative pressure higher than an ordinary threshold is assured, the braking force higher than the ordinary one can be obtained, and the possibility of runaway due to an erroneous operation of the pedal can be reduced.

Further, in the case where the brake is applied when the vehicle speed is equal to or higher than a predetermined value, the operation for closing the throttle valve is carried out irrespective of the detection value of the negative pressure sensor. Consequently, the negative pressure higher than the ordinary threshold can be assured, the braking force higher than the ordinary one can be obtained, and the sufficient braking performance can be obtained also at the time of applying the brake when the vehicle speed is high.

What is claimed is:

1. A brake booster negative pressure controller comprising a brake booster for assuring a master vacuum negative pressure by using a negative pressure of an engine, a throttle valve whose opening angle is operated based on at least one of a stroke of an acceleration pedal and an engine condition, and a brake operation sensing means, wherein said brake booster negative pressure controller comprising a vehicle speed sensing means and a means for closing said throttle valve by a predetermined amount when a vehicle speed sensed by said vehicle speed sensing means is equal to or higher than a predetermined value and a stepping-on of a brake is sensed by said brake operation sensing means.

2. A brake booster negative pressure controller according to claim 1, said brake booster negative pressure controller further comprising a means for changing a throttle value closing amount on the basis of at least one of a vehicle speed sensed by said vehicle speed sensing means and a brake booster negative pressure sensed by said negative pressure sensing means.

3. A brake booster negative pressure controller comprising a brake booster for assuring a master vacuum negative pressure by using a negative pressure of an engine, a throttle valve whose opening angle is operated based on at least one of a stroke of an acceleration pedal and an engine condition, a negative pressure sensing means for sensing a negative pressure in said brake booster, a means for closing said throttle valve by a predetermined amount when the detection sensed value detected by said negative pressure sensing means reaches a value more than a predetermined value indicative of less negative pressure, and a brake operation sensing means, wherein said brake booster negative pressure controller comprising a vehicle speed sensing means and a means for closing said throttle valve by a predetermined amount when a vehicle speed sensed by said vehicle speed sensing means is equal to or higher than a predetermined value and a stepping-on of a brake is sensed by said brake operation sensing means.

4. A brake booster negative pressure controller according to claim 3, said brake booster negative pressure controller further comprising a means for changing a throttle value closing amount on the basis of at least one of a vehicle speed sensed by said vehicle speed sensing means and a brake booster negative pressure sensed by said negative pressure sensing means.

5. A brake booster negative pressure controller comprising a brake booster for assuring a master vacuum negative pressure by using a negative pressure of an engine, a throttle valve whose opening angle can be operated independently from an acceleration stroke of an acceleration pedal, and a brake operation sensing means, wherein said brake booster negative pressure controller comprising an acceleration stroke estimating means for estimating an acceleration stroke, wherein said throttle valve is closed by a predetermined amount when an estimation value of said acceleration stroke is equal to or larger than a predetermined value and the a stepping-on of the brake is sensed by said brake operation sensing means.

6. A brake negative pressure controller according to claim 5, wherein said acceleration stroke estimating means comprising an engine negative pressure sensing means and an engine negative pressure determining means for determining that the driver performs an operation for continuing driving when said engine negative pressure is equal to or larger than a predetermined value.

7. A brake booster negative pressure controller according to claim 6, further comprising a means for changing an amount of closing a throttle valve on the basis of at least one of an engine negative pressure sensed by said engine negative pressure sensing means and a brake stroke amount sensed by said brake operation sensing means.

8. A brake negative pressure controller according to claim 5, wherein said acceleration stroke estimating means comprising an intake air flow sensing means and an intake air flow determining means for determining that the driver performs an operation for continuing driving when said intake air flow rate is equal to or larger than predetermined value.

9. A brake booster negative pressure controller according to claim 8, said brake booster negative pressure controller further comprising a means for changing an amount of closing a throttle valve on the basis of at least one of an intake air flow sensed by said intake air flow sensing means and a brake stepping amount sensed by said brake operation sensing means.

10. A negative pressure controller according to claim 5, wherein said acceleration stroke estimating means comprising an acceleration operation sensing means and an acceleration operation determining means for determining that the driver performs an operation for continuing driving when said acceleration operation amount is equal to or larger than a predetermined value.

11. A brake booster negative pressure controller according to claim 10, said brake booster negative pressure controller further comprising a means for changing an amount of closing a throttle valve on the basis of at least one of an acceleration stroke sensed by said acceleration operation sensing means and a brake stroke sensed by said brake operation sensing means.

12. A brake negative pressure controller according to claim 5, wherein said acceleration stroke estimating means comprising an acceleration operation sensing means and an acceleration operation determining means for determining that the driver performs an operation for continuing driving when a detection value of said acceleration operation sensing means indicates that the acceleration is stepped on are provided as an acceleration stroke estimating means.

13. A brake booster negative pressure controller according to claim 12, said brake booster negative pressure controller further comprising a means for changing an amount of closing a throttle valve on the basis of at least one of an accelerator stroke sensed by said acceleration operation sensing means and a brake stroke sensed by said brake operation sensing means.

14. A brake booster negative pressure controller comprising a brake booster for assuring a master vacuum negative pressure of an engine, a throttle valve configured to operate an opening angle thereof based on at least one of a stroke of an acceleration pedal and an engine condition, a negative pressure sensing means for sensing a negative pressure in said brake booster a brake operation sensing means, and a means for closing said throttle valve by a predetermined amount when the sensed value detected by said negative pressure sensing means reaches a value more than a threshold indicative of less negative pressure, wherein said brake booster negative pressure controller, comprising a vehicle speed sensing means and a means for changing said threshold in accordance with a vehicle speed sensed by said vehicle speed sensing means, wherein said throttle valve is operative to be closed by a predetermined amount when the sensed vehicle speed is at least equal to a predetermined value and stepping-on of the brake is sensed by said brake operation sensing means.

15. A brake booster negative pressure controller according to claim 14, said brake booster negative pressure controller further comprising a means for changing an amount of closing said throttle valve on the basis of at least one of a vehicle speed sensed by said vehicle speed sensing means and a negative pressure sensed by said negative pressure sensing means.

16. A brake booster negative pressure controller comprising a brake booster, a throttle valve whose opening angle can be operated independently from a stroke of an acceleration, a negative pressure sensing means for sensing a negative pressure in the brake booster, a negative pressure determining means for determining that the negative pressure sensed by said negative pressure sensing means is equal to or lower than a threshold, and a means for closing said throttle valve by a predetermined amount when it is determined by said negative pressure determining means that the negative pressure is equal to or lower than the threshold, wherein the controller comprising:

a means for closing said throttle valve by a predetermined amount when the negative pressure is determined to be equal to or lower than the threshold in any of one or more other negative pressure determining means for determining that the negative pressure sensed by said negative pressure sensing means is equal to or lower than a predetermined value;

two or more negative pressure determining means for determining that the negative pressure sensed by any of one or more brake booster negative pressure sensing means is equal to or lower than a predetermined value; and a means for closing said throttle valve by a predetermined amount when the negative pressure is determined to be equal to or lower than a threshold in any of said two or more negative pressure determining means.

17. A brake booster negative pressure controller comprising: a brake booster; a throttle whose opening angle can be operated independently from a stroke of an acceleration; a negative pressure sensing means for sensing a negative pressure in the brake booster; a negative pressure determining means for determining that the negative pressure sensed by said negative pressure sensing means is equal to or lower than a threshold; and a means for closing said throttle valve by a predetermined amount when it is determined by said negative pressure determining means that the negative pressure is equal to or lower than the threshold, wherein said brake booster negative pressure controller comprising:

a means for closing said throttle valve by a predetermined amount when it is determined that the negative pressure is equal to or lower than the threshold in any of at least one of other negative pressure determining means for determining that the negative pressure sensed by said negative pressure sensing means is equal to or lower than a predetermined value;

a means for closing the throttle valve by a predetermined amount when the difference of recognition values of signals of said negative pressure sensing means between said negative pressure determining means and said one or more negative pressure determining means is equal to or larger a predetermined value; one or more other brake booster negative pressure sensing mechanism;

a means for closing said throttle valve by a predetermined amount when the negative pressure is determined to be equal to or lower than a threshold in any of two or more negative pressure determining means which determine that the negative pressure sensed by said one or more other negative pressure sensing means is equal to or lower than a predetermined value; and a means for closing the throttle valve by a predetermined amount when the difference of recognition values of signals from said negative pressure sensing means between said two or more negative pressure determining means is equal to or larger than a predetermined value.

18. A brake booster negative pressure controller comprising a brake booster, a throttle whose opening angle can be operated independently from a stroke of an acceleration, a negative pressure sensing mechanism for sensing a negative pressure in the brake booster, a negative pressure determining means for determining that the negative pressure sensed by said negative pressure sensing mechanism is equal to or lower than a threshold, and a means for closing said throttle valve by a predetermined amount when it is determined by said negative pressure determining means that the negative pressure is equal to or lower than the threshold, wherein said brake booster negative pressure controller comprising:

one or more other negative pressure determining means for determining that a negative pressure sensed by said negative pressure sensing means is equal to or lower than a predetermined value;

a means for closing said throttle valve by a predetermined amount when the negative pressure is determined to be equal to or lower than the threshold in said one or more other negative pressure determining means;

one or more other brake booster negative pressure sensing means;

two or more negative pressure determining means for determining that the negative pressure sensed by said at least one other negative pressure sensing means is equal to or lower than a predetermined value; and a means for closing said throttle valve by a predetermined amount when determination results in said two or more negative pressure determining means do not coincide with each other.

* * * * *